April 6, 1965   R. CLEMENS   3,176,775
STRUCTURES OF AEROFOIL SHAPE
Filed May 28, 1963

Inventor
Ronald Clemens
by Albert Jacks
Attorney

United States Patent Office 3,176,775
Patented Apr. 6, 1965

3,176,775
STRUCTURES OF AEROFOIL SHAPE
Ronald Clemens, Spring Field Road, Winscombe,
Somerset, England
Filed May 28, 1963, Ser. No. 283,927
7 Claims. (Cl. 170—159)

This is a continuation-in-part of application Serial No. 209,202, filed July 11, 1962, now abandoned.

This invention relates to structures of aerofoil shape, the object being to provide an improved structure.

According to the present invention a structure of aerofoil shape comprises a leading portion and a trailing portion, the said leading portion being hollow and consisting of a metal outer skin and a member composed of a mixture of phenol-formaldehyde resin and asbestos fibre in intimate contact with and adhering to the said metal skin, while the trailing portion is secured to the leading portion to complete the aerofoil structure, the amount of phenol-formaldehyde resin in the said mixture being within the range of 30% to 40% by weight.

The leading hollow portion may be U shaped and the tops of the two arms of the U may be closed by a further member.

The inner walls of the hollow portion, that is, those surfaces of the mixture of phenol-formaldehyde resin and abbestos fibre not in contact with the metal outer skin may be lined with an inner metal skin adhering to the said mixture of phenol-formaldehyde resin and asbestos fibre. The edges of the outer and inner metal skins at the outer ends of the arms of the U shaped member may be joined to each other.

The trailing portion may be of any suitable construction, and it may consist of a skin which may be supported by ribs or spars and/or wholly or partially filled with a suitable material, for instance, a low density expanded resin which may adhere to the skin where it is in contact therewith.

The trailing portion may be continuous or consist of a number of spanwise segments and may be attached to the extremities of the arms of the U-section members by bonding, welding, tie-rods or any suitable means.

Figure 1:
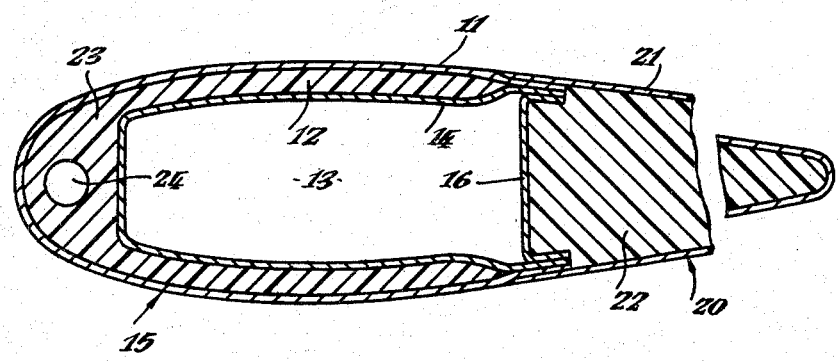
Figure 2:
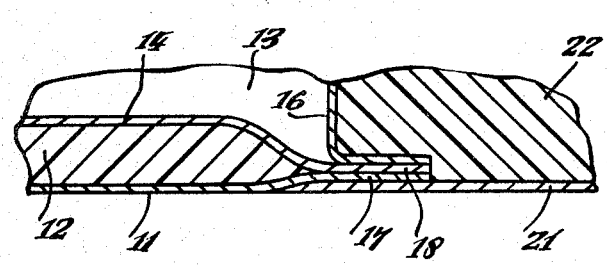

Referring to the accompanying drawings,

FIG. 1 is a transverse section of a structure of aerofoil section, for example, a helicopter rotor blade, embodying one form of the invention; and FIG. 2 is a fragment of FIG. 1 drawn to a larger scale.

Referring to FIG. 1, the leading portion 15 of the helicopter rotor blade comprises an outer skin or layer 11 of metal and an intermediate layer 12 of a mixture of phenol-formaldehyde resin and asbestos fibre, and the portion is hollow at 13.

The amount of phenol-formaldehyde resin in the said mixture is within the range of 30% to 40% by weight.

An inner skin or layer 14 of metal is provided, the layer 12 of the mixture of phenol-formaldehyde resin and asbestos fibre being disposed between the two metal layers 11 and 14 and bonded thereto in intimate contact therewith. In some cases, however, the inner skin or layer may be omitted.

The leading portion 15 of the blade section has a section which is substantially of U shape with a closure 16 joining the ends of the two arms of the U, the base of the U providing the leading edge of the blade.

The edges 17, 18 of the outer and inner metal skins 11 and 14, at the outer ends of the arms of the U-shaped member, are joined to each other by welding or bonding.

The outer ends of the U-shaped leading portion 15 of the blade are joined together by a channel section element 16 which closes the section of the said portion and leaves the interior hollow at 13.

The trailing portion 20 of the blade comprises an outer skin 21 of metal, together with low density expanded resin 22 which wholly fills the space bounded by the said skin 21 and the closure member 16, the said resin 22 being bonded to the metal skin 21.

The outer skins 11 and 21 of the leading and trailing portions of the blade are complementary to each other to comprise the outer skin of the complete structure.

The base 23 of the U-shaped leading portion 15 of the blade, which base provides the leading edge of the blade, has a thicker intermediate layer or portion of the mixture of phenol-formaldehyde resin and asbestos fibre 12 than the arms of the U, and the said thicker base portion has a passage 24, or several passages, formed therein for the purpose of providing a duct or ducts for fluid and/or to enable balancing of the blade to be effected, or may have embedded in it elements such as conductors.

The outer skin or layer 11 is such that the layer 12 of the mixture of phenol-formaldehyde resin and asbestos fibre will bond to said outer skin or layer 11 upon the application thereto of heat and pressure, without the use of other adhesive. Suitably, the metal skin or layer 11 is stainless steel, aluminium, aluminium alloy, or titanium.

The inner metal skin or layer 14 also may be stainless steel, aluminium, aluminium alloy or titanium.

Suitably, in order to form the structure, the outer skin 11 is laid in a mould to which it conforms in shape, the intermediate layer or body 12 of a mixture of phenol-formaldehyde resin and asbestos fibre is placed within the outer skin 11, and then the inner skin 14 is placed in position, the whole assembly having pressure and heat applied thereto to effect consolidation and adherence of the mixture of phenol-formaldehyde resin and asbestos fibre to the metal outer and inner skins. The pressure may be within the range of 5 lbs. to 750 lbs. per square inch, and the temperature may be within the range of 150° C. to 180° C. After a curing period of time depending on the mass of material involved and the method of heating employed, the material is allowed to cool whilst the pressure is maintained. When the material has cooled to about 80° C. it is removed from the mould.

The mechanical properties of the material can be improved by a post-curing treatment, such as reheating the material to a temperature of 200° C. for a period of 3 hours at a pressure of 500 lbs. per square inch.

It may be found desirable to prepare the surface of the metal skin or layer 11 or 14 before bonding it to the layer 12. For example, when the metal layer 11 or 14 is aluminium or aluminium alloy the relevant surface of the metal sheet may be treated by chromic anodising or sulphuric anodising, and preferably the bonding to the layer 12 is effected within 24 hours of such treatment.

The process described secures firm adhesion of those asbestos fibres which are contiguous to the metal surface and is quite distinct from processes which rely on the bonding characteristics of phenolic or other adhesives, and the adhesion characteristics (for example, the "peeling" strength) of a structure made according to the process as described herein also differ to a marked extent from the plain adhesive-bonded joint. The function of the phenolic resin is (1) to bond the fibres into a homogeneous moulded material and (2) to attach the contiguous fibres to the metallic surface or surfaces. It has been found that if too much resin is present the bond strength falls off very sharply. This is because a film of phenolic resin becomes interposed between the fibres and the metal surface and the strength characteristics of the resulting bond are then no greater than those of the resin itself. On the other hand if insufficient resin is present there will again be a diminution of strength because a smaller proportion of fibres will be bonded. It is for this reason that the resin/fibre ratio is specified between certain limits within which optimum bonding is secured.

What I claim and desire to secure by Letters Patent is:

1. A structure of aerofoil shape, comprising a leading portion and a trailing portion, the said leading portion being hollow and consisting of a metal outer skin and a member composed of a mixture of phenol-formaldehyde resin and asbestos fibre in intimate contact with and adhering to the said metal skin, while the trailing portion is secured to the leading portion to complete the aerofoil structure, the amount of phenol-formaldehyde resin in the said mixture being within the range of 30% to 40% by weight.

2. A structure according to claim 1, wherein the trailing portion comprises a skin.

3. A structure according to claim 2, wherein a low density plastic material is enclosed by the skin of the trailing portion.

4. A structure according to claim 1, wherein the said leading hollow portion further consists of a metal inner skin which adheres to the said mixture of phenol-formaldehyde resin and asbestos fibre which is disposed between the said outer and inner skins.

5. A structure according to claim 1, wherein the said leading hollow portion comprises inner and outer metal skins each of U section, the adjacent edges of the arms of the two U sections being secured to each other to enclose a space between the two skins which is occupied by the said mixture of phenol-formaldehyde resin and asbestos fibre, and the edges of the two arms of the composite U-shaped member formed by the two metal skins are joined together by a closure member whereby an enclosed hollow space is formed within the said leading portion.

6. A structure according to claim 5 wherein the base portions of the said U-shaped inner and outer metal skins are spaced further apart than in the arms of the U so as to provide a thickening of the layer of said mixture of phenol-formaldehyde resin and asbestos fibre at the leading edge of the structure.

7. A structure according to claim 6, wherein at least one passage is provided in the said thickened leading edge portion of the mixture of phenol-formaldehyde resin and asbestos fibre.

References Cited by the Examiner

UNITED STATES PATENTS

| | | | |
|---|---|---|---|
| 2,182,812 | 12/39 | Longheed | 170—159 |
| 2,361,438 | 10/44 | Turner | 170—159 |
| 2,645,435 | 7/53 | Pouit | 170—135.4 |
| 2,648,388 | 8/53 | Haines et al. | 170—159 |
| 2,715,598 | 8/55 | Rees et al. | 253—77 |
| 2,754,915 | 7/56 | Echeverria | 170—159 |
| 2,818,223 | 12/57 | Doblhoff | 170—135.4 |
| 2,895,936 | 7/59 | Archer et al. | 170—159 |

FOREIGN PATENTS 1,108,081  5/61  Germany.

OTHER REFERENCES

"Missiles and Rockets" magazine, page 69, March 1958.

JULIUS E. WEST, *Primary Examiner.*